April 30, 1946.  O. APPEL  2,399,310

SYSTEM FOR COOLING THE CHARGE FLOWING TO AN INTERNAL-COMBUSTION ENGINE

Filed Feb. 25, 1944　　2 Sheets-Sheet 1

INVENTOR,
Oscar Appel,
BY John W. Steward
ATTORNEY.

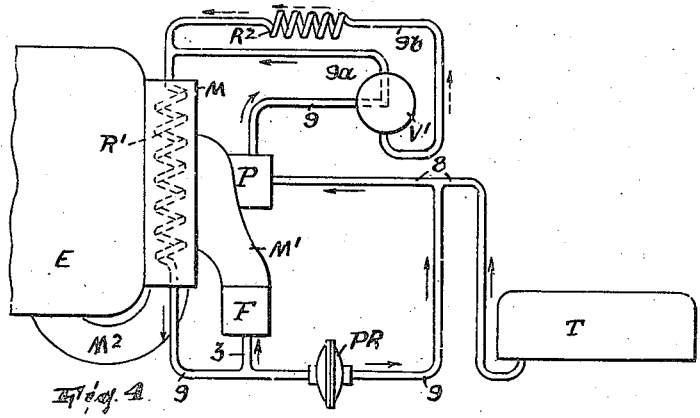
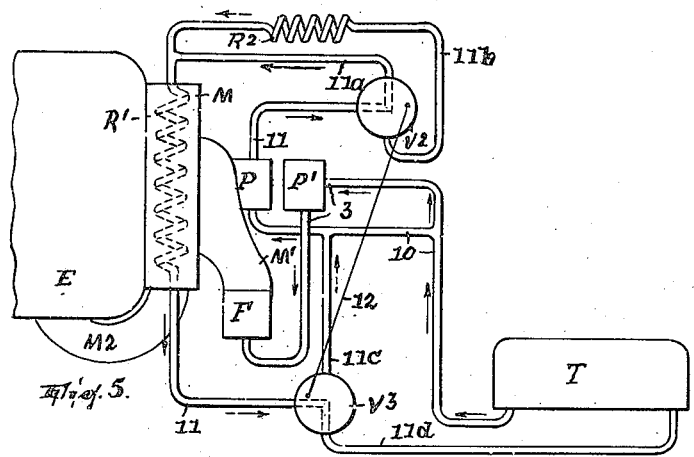
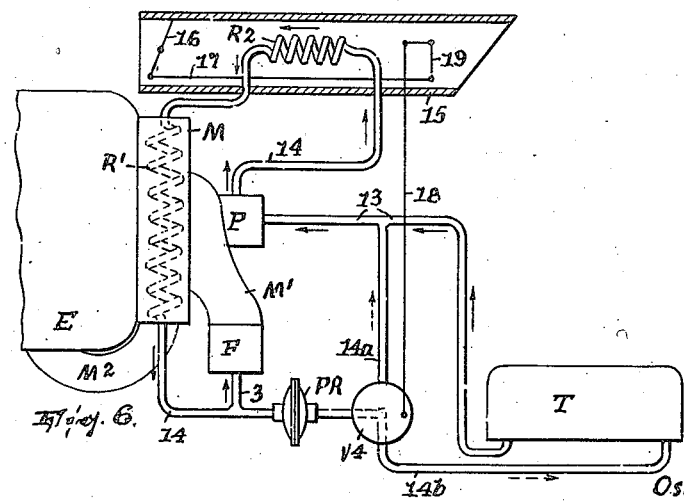

Patented Apr. 30, 1946

2,399,310

UNITED STATES PATENT OFFICE 2,399,310

SYSTEM FOR COOLING THE CHARGE FLOWING TO INTERNAL-COMBUSTION ENGINES

Oscar Appel, Paterson, N. J.

Application February 25, 1944, Serial No. 523,848

6 Claims. (Cl. 123—119)

In the operation of a supercharger for an internal-combustion engine an incident thereof is the heating of the charge (as fuel-air, if a carburetor is used, or air, alone, if an injector is used) delivered by the supercharger, with consequent detonation in the engine, the heating and likelihood of detonation of course being greatest when the manifold pressure is high, as when the engine is operating under high power output. Superchargers are used considerably in combination, for instance, with air-plane internal-combustion engines using a fuel-air mixture, and the underlying object of this invention has therefore been to provide a system adapted for cooling that portion of the passaged means, as of a supercharger, through which at least the air of the charge flows whereby, when the engine is operating under high manifold pressure, the cooling will be derived from the fuel itself, pre-cooled (as refrigerated) for that purpose, and when some lower manifold pressure obtains, as when flying at high altitude and hence in colder atmosphere following the climb, or it may be also in "warming up" the engine, such cooling as is then required will be derived from the atmosphere.

Given such a passaged means through which a charge is conveyed to an internal-combustion engine, my invention contemplates combining therewith a fluid conducting system which shall include a container for cooled fluid fuel and a fluid conductor to which the container discharges and which itself discharges to said system (as to the conductor or to the container) and which includes, with a heat-receiving radiator in heat-receiving proximity to the portion of said means through which at least the air of the charge flows, a heat-discharge radiator (as exposed to the atmosphere), both of which are relatively aft (i. e., relatively to the direction of flow) of the point at which the conductor discharges to said system, means to impel the fluid from the container and through the conductor, said conductor having, relatively aft of said point, a fuel delivery outlet (to be indicated) discharging to said passaged means, and means, as a pressure regulator or a pump, for maintaining the fuel-pressure at the outlet greater than such fuel-pressure in the passaged means itself. In the example herein set forth so much of the passaged means as includes the supercharger affords a common passage for the fuel and air, a carburetor being assumed to be used to provide a fuel-air mixture, but my invention, in view of the known indicated resort to an injector in place of a carburetor, is not to be regarded as thus limited.

Having such a system and the impelling means combined with said passaged means the fluid will be circulated in said system wherefore, with the fluid pre-cooled (as refrigerated, or otherwise having a temperature lower than normal, i. e., lower than air temperature at surface level) the following advantageous conditions are possible: While the plane is on the ground, the engine merely being warmed up and the impelling means operating at low effort, the necessity for cooling the supercharged air being low, a relatively little quantity of cold fluid (or it may be none as will hereinafter be evident from Fig. 5) will enter the conductor thus to lower the temperature of the fluid continuously flowing therethrough, and in any event at such time the receiving and discharge radiators would be effective in transferring heat from the compressed charge of the supercharger to the atmosphere (or first by the receiving radiator to the circulating fluid and then by such fluid to the discharge radiator). But, with the impelling means operating at high effort, these conditions will change since a correspondingly greater quantity of fluid from the container will then enter the conductor, thus correspondingly to lower the temperature of the circulating fluid. This is advantageous during the take-off, for then the pre-cooled fluid in the conductor is available to mix with and so cool the circulating fluid. Further when, the take-off being completed, level flying at high altitude ensues the said system will also function to cool, even if the fluid of the container may have meanwhile had its temperature somewhat raised above its original degree, since the discharge radiator, by its exposure to the colder atmosphere at the now high level, is then available to coact with the receiving radiator to deliver to the atmosphere such heat as the circulating fluid derives from the supercharged charge.

By the two radiators in the present example the heat accumulating in the passaged means is transferred to the fluid and then from the fluid to the atmosphere, or first via the receiving radiator and then via the discharge radiator, wherefore they constitute means for so transferring the heat; and I claim accordingly in certain of the annexed claims.

The invention may exist variously modified as will hereinafter appear and in accordance with the annexed drawings which illustrate the same diagrammatically in the Figures 1 to 6, inclusive, as to which, Fig. 1 shows a form in which the conductor discharges to itself;

Fig. 4 shows a form like that of Fig. 1 excepting that between the pump P and the supercharger-containing portion M of the passaged means, the conductor has branches by-passing each other and one of which contains the heat-discharge radiator R2, there being a valve to switch the flow to either such branch;

Fig. 5 shows a form like that of Fig. 4 excepting that the branch, as 3, for conducting the fuel to the portion M contains a pump P' for maintaining the pressure at the intake to such branch greater than in the branch itself; and Fig. 6 shows a form like that of Fig. 4, with the heat-discharge radiator R2 contained in an air-chute.

In all the figures let M denote the supercharger-containing portion of the passaged means through which portion the fuel as well as the air in this example flows to the engine, such charge being heated by compression incident to the supercharger, M' being the intake to and M² the discharge duct of said portion, the latter extending to the engine. Said passaged means in this case also includes a fuel-feeding means F; here assumed to be a carburetor, discharging to intake M' and having a fuel feeding branch pipe 3 leading to such means F. At F is the fuel feeding means, here assumed to be a carburetor and therefore discharging to intake M'. P is the pump or equivalent means for impelling the fuel. In all the figures there are also the part T, R', R2 and 3 and (except in Fig. 5) the part PR to be referred to.

Figure 1:
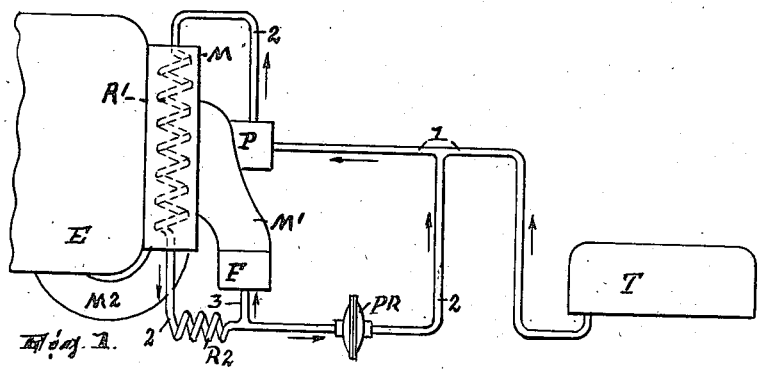

In Fig. 1 my said system includes a tank or other container T for containing the pre-cooled fuel and a fuel conductor existing as follows: 1 is a pipe leading from the container T and to which the latter discharges and which itself discharges to the intake side of the pump P; and 2 is a pipe leading from the pump and to which the latter discharges, the same being coiled at R' to form a receiving radiator and at R2 to form a discharge radiator and said pipe having its end remote from the container discharging to that portion of the conductor which is between the container and the pump, wherefore the portion of the conductor which includes the radiators is developed endless. The fuel flow is as per the arrows shown. The receiving radiator R' is in some such close proximity to the passaged means M (as here within it) that the heat of the charge will be conveyed to the fuel flowing through said radiator. Pipe 3, being connected to pipe 2, serves as a fuel-delivery branch discharging to the fuel-feeding means F. Radiator R2 is between radiator R1 and the intake end of the branch pipe, or, otherwise regarded, the outlet from the conductor to said branch. At PR is the means for maintaining the pressure in the conductor at the said intake of the branch, or such outlet greater than in the branch itself and hence in the passaged-means of which said branch in this example forms a part, being here any pressure-regulator located aft of the branch in the direction of flow through the system.

The pump being driven, fuel will be drawn from the container and caused to circulate via the endless part of the conductor, some of the flowing fuel being diverted via the branch to the fuel feeding means F thereupon to form with air (in this example) the fuel charge which is to be compressed by the supercharger and conveyed to the engine (such diversion in this case being incident to the pressure-regulator) and such fuel as is thus diverted being constantly replaced in the conductor by fuel from the container T. If the fuel in the container is therefore pre-cooled such as flows therefrom to the conductor to mix with the fuel already in the conductor will absorb heat from the latter that has been transferred thereto from the charge compressed by the supercharger. The system will therefore operate on warming-up the engine, on the take-off and on level-flying on completion of the climb as hereinbefore set forth, the pre-cooled fuel in the tank serving to cool during the take-off and the discharge radiator serving, by transfer of heat to the atmosphere, also to cool, as on the level-flying at the higher atmosphere, or it may be during the latter part of the climb if the cold-fuel supply is exhausted and the elevation is such that the atmospheric temperature is low.

Figure 2:
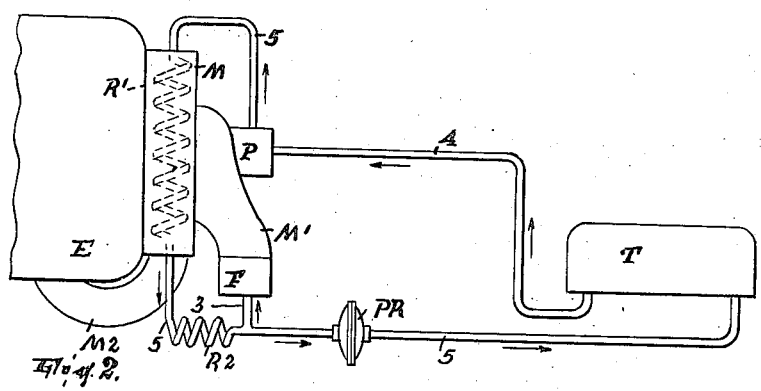
Fig. 2 shows a form in which the conductor discharges to the container.

In Fig. 2 the conductor pipe corresponding to pipe 1 is designated 4. A conductor pipe 5, corresponding to pipe 2 and here containing the two radiators R' and R2 and the pressure-regulator PR and having the branch 3 leading therefrom to the fuel feeding means, has its end remote from the container (or, as per the direction of flow aft of the pressure-regulator) discharging to the container. The operation in this case is substantially the same as in the Fig. 1 construction excepting that the temperature of the fuel in the container will not be so long preserved cold as in the case of the Fig. 1 construction due to dilution of the cold fuel in the container by warmer fuel delivered thereto by conductor pipe 4.

Figure 3:
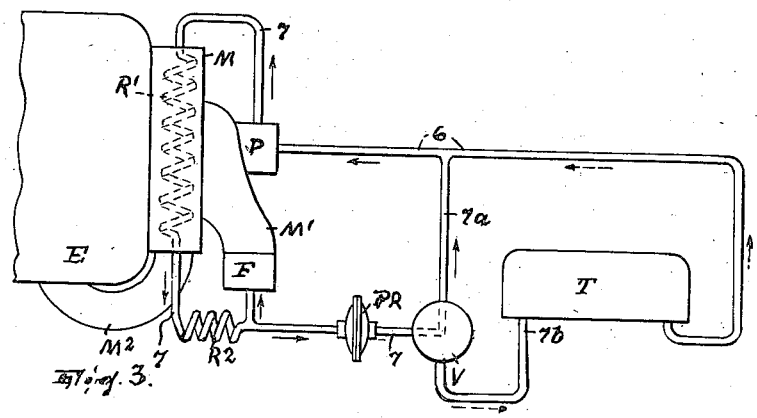
Fig. 3 shows a form in which the conductor, being branched, one branch discharges to the conductor and the other to the container, there being a valve to switch the flow to either branch.

In Fig. 3 conductor pipe 6 corresponds to pipe 1. A conductor pipe 7, corresponding to pipe 2 and likewise containing the radiators and the pressure-regulator and having the branch 3 leading therefrom to the fuel feeding means, has aft of the branch two discharge branches 7a and 7b the former of which discharges to that portion of the conductor 6 which is between the container and the pump and the latter of which discharges to the container; and at V is a valve, here rotary, for switching the fuel flow from pipe 7 to either of its branches. This construction is therefore in effect a hybrid of the Figs. 1 and 2 constructions in that it may be operated as either of them is operated.

In the constructions so far described there is no control of the dispensing of the cold fuel in the container such as is afforded by the construction shown by Fig. 4. In this case 8 is the conductor pipe to which the container discharges and which discharges to the pump P. From the latter extends a conductor pipe 9, for a part of its length between the pump and the radiator R' existing as divided into two portions 9a and 9b by-passing each other, thereafter including said radiator R' and the pressure-regulator PR and having the branch 3 to the fuel feeding means; the end of pipe 9 remote from the container discharging to that portion of the conductor 8 which is between the container and the pump. The branch 9b contains the radiator R2. At V' is a valve for switching the fuel via either of the branches 9a and 9b. While the engine is being warmed up or on the take-off and during such part of the climb as seems necessary the valve may be in the position shown, or so that the flow from the pump and hence the container is via branch 9a. Thereupon the valve may be turned to switch the fuel to the branch 9b containing the radiator R2, as at level high-altitude flying.

The construction of Fig. 5 embodies features similar to those of Figs. 3 and 4 and in this case the means for maintaining the pressure at the intake to the branch 3 greater than in the branch itself takes the form of a pump P' for delivering fuel to the feeding means, thus: 10 is the conductor pipe to which the container discharges and which discharges to the pump P. From pump P extends a conductor pipe 11, divided (as in Fig. 4) at 11a and 11b to provide portions bypassing each other and the portion 11b containing the radiator R2; and, relatively aft of these portions pipe 11 contains radiator R' and is then divided again (as in Fig. 3) at 11c and 11d, portion 11c discharging to that portion of the conductor which is between the container and the pump P and portion 11d discharging to the container. There is a valve V2 (corresponding to valve V' in Fig. 4) for switching the fuel via either of the portions 11a and 11b and a valve V3 (corresponding to valve V in Fig. 3) for switching the fuel to either of the portions 11c and 11d. The branch 3 extends from pipe 10 to the means F (the same as corresponding branch extends from the corresponding pipes 2, 5, 7 and 9 in Figs. 1, 2, 3 and 4, respectively), but, instead of the pressure-regulator being present therein, it contains the mentioned pump P' for maintaining the fuel-pressure at the outlet of pipe 10 to the branch 3 greater than the fuel-pressure in the branch itself. The two valves V2 and V3 are connected by a link 12 so as to be operated in unison. As shown the fuel flow via the conductor during the climb, as well as on warming-up and on the take-off, is as per the solid arrows adjoining the conductor pipes 10 and 11 and the portions 11a and 11d; when level-flying, following the climb, ensues (or it may be during the latter part of the climb) the valves may be shifted so that the flow will be via pipes 10 and 11, portions 11c and 11b and hence radiator R2.

In Fig. 6 the conductor is characterized the same as that in Fig. 3 in that there is the conductor pipe 13 to which the container discharges and which discharges to the pump and a conductor pipe 14 to which the pump discharges and which contains both radiators and from which, aft of the radiators, the branch 3 leads to the fuel feeding means and aft of such branch there is the pressure regulator and aft of the latter said pipe is branched, as at 14a and 14b, branch 14a discharging to the conductor between the container and pump and branch 14b discharging to the container, V4 being a valve corresponding in function to valve V of Fig. 3 or V3 of Fig. 5. (However, as to so much, the construction may be the same as in Fig. 1 or Fig. 2). But radiator R' is in this case positioned aft of radiator R2 and the latter radiator is subject to cooling influence changeable at the will of the operator. Thus: An air-chute 15, extending lengthwise of the engine, is formed open at both ends but is provided with a pivoted damper 16 movable to permit or check the air-flow through the chute, which contains radiator R2. This damper may be connected with valve V4 to move in unison therewith, as by the links 17 and 18 and intermediate bell-crank lever 19. On the take-off, with the damper and valve in the positions shown, the fuel flow is as per the solid arrows or so that such cooling as is required is derived from the cold fuel flowing from the container. But on warming-up and for high-level flying the damper and valve are shifted so that (the damper being open) cold air may cool radiator R2 and the flow will be made to short-circuit the container.

As will be apparent, so long as the radiators are in the endless part of the system (i. e., excluding or including the container T in Fig. 1 or Fig. 2, for instance) the order of their arrangement is not material since in any such case the circulating body of fuel would have its temperature reduced either by the colder fuel flowing from the container or by the cooling influence of radiator R2.

In the case where the conductor is branched and one branch discharges to the container and the other to the conductor, and there is a valve, as V3, Fig. 5, to direct the flow via either branch independently of the other, it will be apparent that no fuel will be drawn from the container into that part of the system which exists endless when the valve is turned to the position to direct the flow via branch 11c.

Since the fuel is a fluid, and conceivably might be a gas, it is obviously not material that the conductor pipe in any of the forms shown provides for withdrawal of the fuel at the bottom of the tank T.

So long as the fuel-pressure, by suitable means (as PR or, in Fig. 5, the pump P'), is maintained at the mentioned outlet by which the fuel enters the passaged means greater than such fuel-pressure in the passaged-means itself, it is not essential that the fuel be delivered to the engine with the air via a common passage of the passaged means.

Having thus fully described my invention, what I claim is:

1. In combination, with passaged means through which a charge is conveyed to an internal-combustion engine, a fluid-conducting system including a container for cooled fluid and a fluid conductor to which the container discharges and having discharge branches one of which discharges to the conductor and the other to the container, a valve for switching the fuel to either branch independently of the other, said conductor, aft of the point at which the one branch discharges to the conductor and anterior to said valve, including, with a heat-receiving radiator in heat-receiving proximity to said means, a heat-discharge radiator, and means to impel the fluid from the container and through the conductor.

2. In combination, with passaged means through which a charge is conveyed to an internal-combustion engine, a fluid-conducting system including a container for cooled fluid and a fluid-conductor to which the container discharges and which itself discharges to said system, whereby the latter exists at least in part endless, and such endless part including in one segment of its length a heat-receiving radiator in heat-receiving proximity to said means and having another segment of its length formed as two conductor portions in by-passing relation to each other and one of which includes a heat-discharge radiator, a valve for switching the fluid via either of said portions independently of the other, and means to impel the fluid from the container and through the conductor.

3. In combination, with passaged means through which a charge is conveyed to an internal-combustion engine, a fluid-conducting system including a container for cooled fluid and a fluid-conductor to which the container discharges and having discharge branches one of which discharges to the conductor and the other to the container, a valve for switching the fluid via either branch independently of the other, said conductor, aft of the point at which the one branch discharges to the conductor and anterior to the valve, including in one segment of its length a heat-receiving radiator in heat-receiving proximity to said means and having another segment of its length formed as two conductor portions by-passing each other and one of which includes a discharge-radiator, a valve for switching the fluid via either of said portions independently of the other, and means, aft of the point at which the conductor discharges to itself, to impel the fluid from the container and through the conductor.

4. In combination, with passaged means through which a charge is conveyed to an internal-combustion engine, a fluid-conducting system including a container for cooled fluid and a fluid conductor to which the container discharges and having discharge branches one of which discharges to the conductor and the other to the container, a valve for switching the fluid to either branch independently of the other, said conductor, aft of the point at which the one branch discharges to the conductor and anterior to said valve, including means to transfer to the fluid and then from the fluid to the atmosphere the heat accumulating in said passaged means, and means to impel the fluid from the container and through the conductor.

5. In combination, with passaged means through which, with air, a cooled fuel is conveyed to an internal-combustion engine, a conducting system including a container for the cooled fuel and a fuel conductor to which the container discharges and which itself discharges to said system and includes, relatively aft of the point at which the conductor discharges to said system, means to transfer to the fuel and then from the fuel to the atmosphere the heat accumulating in the portion of said passaged means, through which at least the air is conveyed, means to impel the fuel from the container and through said system, said system having a fuel-delivery outlet discharging to said passaged means, and means in the conductor for maintaining the fuel-pressure at said outlet greater than the fuel-pressure within the passaged means itself.

6. In combination, with passaged means through which the components of a fuel-air charge are conveyed to an internal-combustion engine, a fluid fuel conducting system including a container for cooled fluid fuel and a conductor for such fuel and to which the container discharges and which itself discharges to said system and includes, with a heat-receiving radiator in heat-receiving proximity to the portion of said means through which at least the air-component is conveyed, a heat-discharge radiator both of which are relatively aft of the point at which the conductor discharges to said system, means to impel the fuel from the container and through the conductor, said conductor having, relatively aft of said point, a fuel-delivery outlet discharging to said passaged means, and means in the conductor for maintaining the fuel-pressure at said outlet greater than the fuel-pressure within the passaged means itself.

OSCAR APPEL.